UNITED STATES PATENT OFFICE.

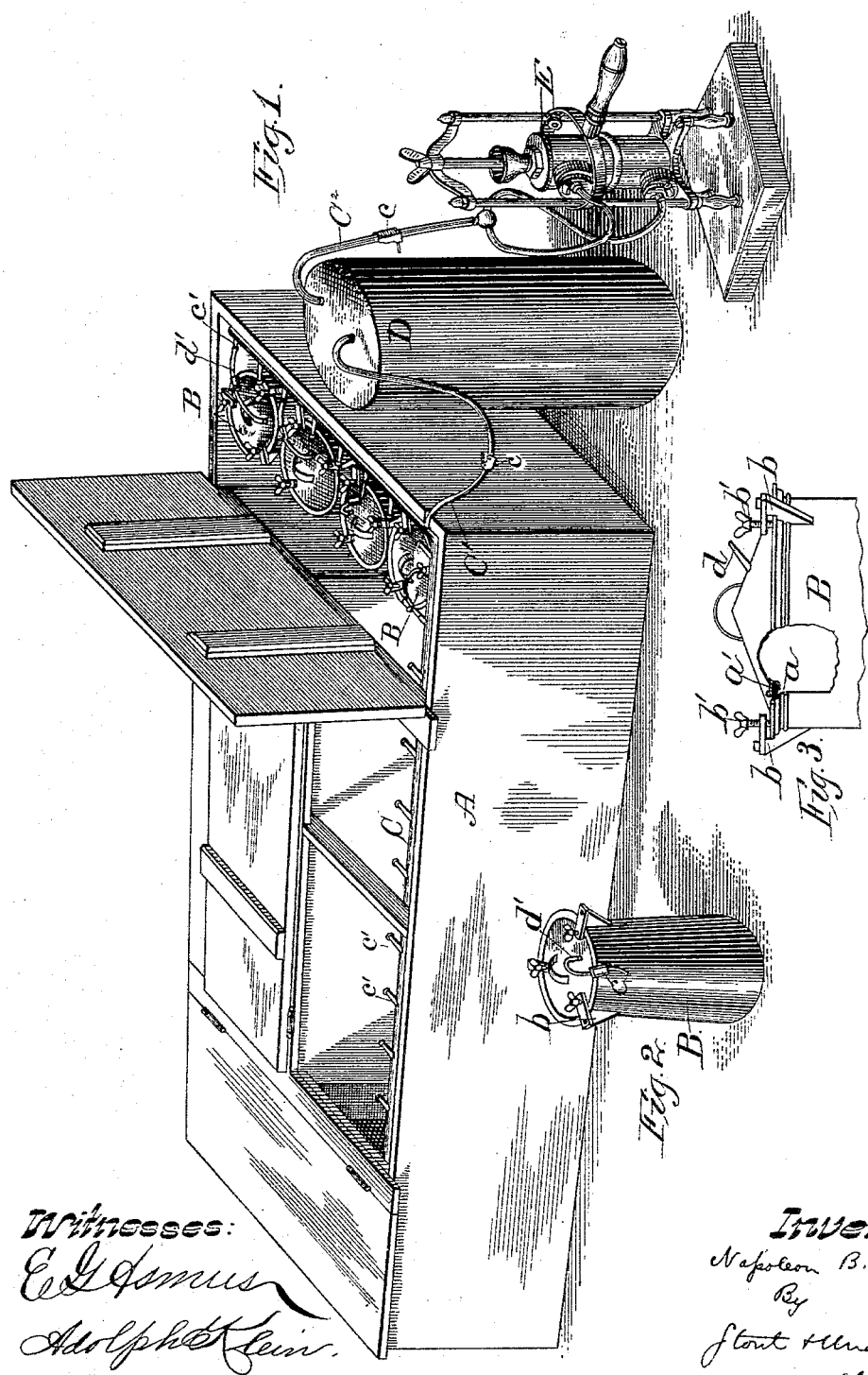

NAPOLEON B. BLACKMER, OF PORTAGE, WISCONSIN.

VACUUM-CREAMER.

SPECIFICATION forming part of Letters Patent No. 325,482, dated September 1, 1885.

Application filed March 25, 1884. (No model.)

*To all whom it may concern:*

Be it known that I, NAPOLEON B. BLACKMER, of Portage, in the county of Columbia, and in the State of Wisconsin, have invented certain new and useful Improvements in Vacuum-Creamers; and I do hereby declare that the following is a full, clear, and exact description thereof.

My invention relates to the treatment of milk, cream, and butter; and it consists in certain apparatus to be used in subjecting these substances to a vacuum process which deprives them of all their fermentatious ingredients, as will be fully described hereinafter.

In the drawings, Figure 1 is a perspective view of a chest for containing cans of milk while their contents are being treated, together with a pump for exhausting the air from them. Fig. 2 is a perspective view of one of my cans, and Fig. 3 is a side view of the upper part of a can with part broken away to show its interior.

A is the chest, in which I arrange cans B in position to be coupled to the branches $c'$ of a pipe, C, that extends around the edge of the chest, and this pipe is connected by a rubber tube, C', with a vacuum-chamber, D, which in turn is connected by another flexible tube, C², with an air-pump, E, and I provide each of these tubes with a pinch-cock, $c$, by which the vacuum-chamber may be cut off from either the air-pump or cans.

I make my cans of a strength that will bear a heavy pressure, and provide each with a flaring mouth, $a$, and I provide the rim of each l d with a rubber strip, $a'$, that projects out from its under side. I also provide the can with brackets $b$ and tightening-screws $b'$, the latter serving to insure an air-tight joint between the lid and mouth of the can.

A tube, $d$, that projects up from the lid of each of my cans, serves to take a small rubber pipe, $d'$, which connects it either to a branch of the pipe C or, when one can only is used, directly with the air-pump or vacuum-chamber, and I provide this pipe $d'$ with a pinch-cock, $c$, to be used whenever the air has been exhausted from a can, and it is ready to be removed from the chest.

I may treat only one can at a time or several. I have shown but four cans connected with the pump, and to prevent the entrance of air through the free branches of the pipe C, I slip rubber thimbles over their ends; but I may provide these branches with small stop-cocks.

Operation: The milk (for instance) is poured into the cans and the lids fastened securely in place. Then the cans are connected by the pipes or tubes with the vacuum chamber or pump and the air is exhausted, and as the air passes off it carries with it all the impurities of the milk, especially the animal odors, and it also causes the cream to rise from the milk in a much shorter time than when milk is set in the open air.

Rancid butter, or butter which is made from the cream of milk that contained impurities, may be purified by my process. The butter is placed in cans similar to those above described, with a strong brine, and then the air is exhausted, and as the air is drawn out of the butter the salt and brine take its place, and it becomes just as sweet as any butter can be, and it is reasonable that this should be so, as all the gases which had formed in the butter are carried out with the air.

I find that milk which is treated by my process makes a better cheese, besides which I save all the cream for the manufacture of butter. By taking the night's milk which has remained in the vacuum-cans twelve hours, and the morning's milk which has remained two and a half hours, skimming the same, and then mixing the milk from both settings, and making it into cheese in the ordinary way, the cheese is equal in quality to the best cream cheese, and has the additional advantage of remaining moist when cut and exposed to the air, instead of drying up, as is usually the case with the dairy-cheese. The poor quality of what has been known as "skim-milk cheese" arises from the fact that heretofore the milk from which it was made was allowed to stand in open or partially-open vessels while the cream was rising, and hence certain valuable qualities of the milk passed off in evaporation. This loss is prevented by my process, and hence both the milk in my vacuum-cans and the cheese made therefrom are of improved quality on account of not having suffered deterioration from evaporation.

My chests are made tight and adapted to hold water to regulate the temperature of the contents of the cans.

I am aware that heretofore milk and butter have been placed in closed receptacles and subjected to a vacuum by means of an air-pump for the extraction of deleterious gases therefrom and to hasten the separation of the cream from the milk, and such, therefore, I do not broadly claim; but

What I claim as new, and desire to secure by Letters Patent, is—

1. A water tank or chest having a pipe arranged about its side and end, in combination with milk-receptacles placed therein, tubes attached to the covers of said receptacles and communicating with branch tubes of said pipe, and an air-pump connected with said tubes, substantially as described.

2. A water tank or chest adapted to hold removable milk-receptacles and having arranged about its inner side and end below its lid a pipe provided with branches, in combination with said receptacles provided with closed lids having tubes projecting therefrom, flexible tubes fitted with pinch-cocks and connecting the tubes in the receptacle-lids with the pipe branches, and an air-pump connected with the pipe in the inside of the chest, substantially as set forth.

3. The combination of the water tank or chest A, having interior pipe, C, provided with branches $c'$ $c'$, and arranged along the inner side and end of the chest, receptacles B B, provided with closed covers having projecting pipes $d$, connecting flexible pipes $d'$, with pinch-cocks $c$, air-pump E, and intermediate vacuum-chamber, D, and connecting-pipes $C'$ $C^2$, substantially as set forth.

In testimony that I claim the foregoing I have hereunto set my hand, on this 23d day of February, 1883, in the presence of two witnesses.

NAPOLEON B. BLACKMER.

Witnesses:
S. S. STOUT,
H. G. UNDERWOOD.